United States Patent [19]

Paul

[11] Patent Number: 4,730,347
[45] Date of Patent: Mar. 8, 1988

[54] METHOD AND APPARATUS FOR REDUCING JITTER IN A SYNCHRONOUS DIGITAL TRAIN FOR THE PURPOSE OF RECOVERING ITS BIT RATE

[75] Inventor: Philippe Paul, Ploubezre, France

[73] Assignee: Alcatel, Paris, France

[21] Appl. No.: 872,723

[22] Filed: Jun. 10, 1986

[30] Foreign Application Priority Data

Jun. 10, 1985 [FR] France ................. 85 08742

[51] Int. Cl.⁴ ............... H04L 25/36; H03K 17/26
[52] U.S. Cl. .......................... 375/118; 328/63; 328/74; 360/51; 375/14
[58] Field of Search ............ 328/63, 72, 74; 360/51; 367/48; 371/62; 375/14, 118

[56] References Cited

U.S. PATENT DOCUMENTS

| | | | |
|---|---|---|---|
| 3,057,959 | 10/1962 | Rowe | 375/118 X |
| 3,629,712 | 12/1971 | Clark | 328/109 |
| 3,663,883 | 5/1972 | Olso | 328/72 |
| 4,134,073 | 1/1979 | MacGregor | 375/118 X |
| 4,328,587 | 5/1982 | Mizuno et al. | 375/118 X |

FOREIGN PATENT DOCUMENTS 0121750 10/1984 European Pat. Off.
3332939 3/1985 Fed. Rep. of Germany.
0130657 8/1983 Japan ............ 375/118

Primary Examiner—Stephen C. Buczinski
Assistant Examiner—Linda J. Wallace
Attorney, Agent, or Firm—Sughrue, Mion, Zinn, Macpeak and Seas

[57] ABSTRACT

The method consists of using the recovered bit rate signal to define a time window which overlaps the beginning, but not the end of each jitter range in the version of the digital train intended for use by the bit rate recovery circuit. Those transitions in said version of the digital train which occur during said window are then delayed by a fixed delay of duration less than the maximum peak-to-peak amplitude of the jitter. Other transitions are not delayed. The apparatus shown is intended to operate with a binary version I of the digital train and with a recovered bit rate signal H which is symmetrical and rectangular in shape with a first one its levels defining a time window which extends over the second half of each period in the digital train. The apparatus is essentially constituted by a pulse generator (10) which transforms the transitions in the binary version I of the digital train into pulses of duration τ equal to one-half of the maximum peak-to-peak amplitude of the jitter, a first D-type register (11) delaying transitions in the recovered bit rate signal (8) so that they lie outside the pulses generated by the pulse generator (10), and a second D-type register (12) which delays transitions in the binary version I to lie outside the periods when the recovered bit rate signal having possibly delayed transitions (J) is at its first level. The apparatus is entirely constituted by logic circuits and is easy to integrate.

8 Claims, 9 Drawing Figures

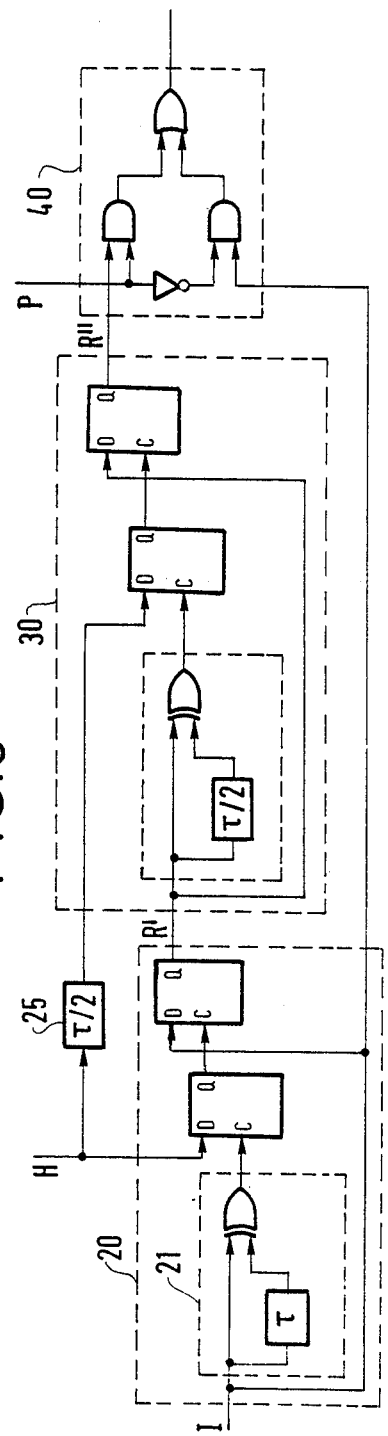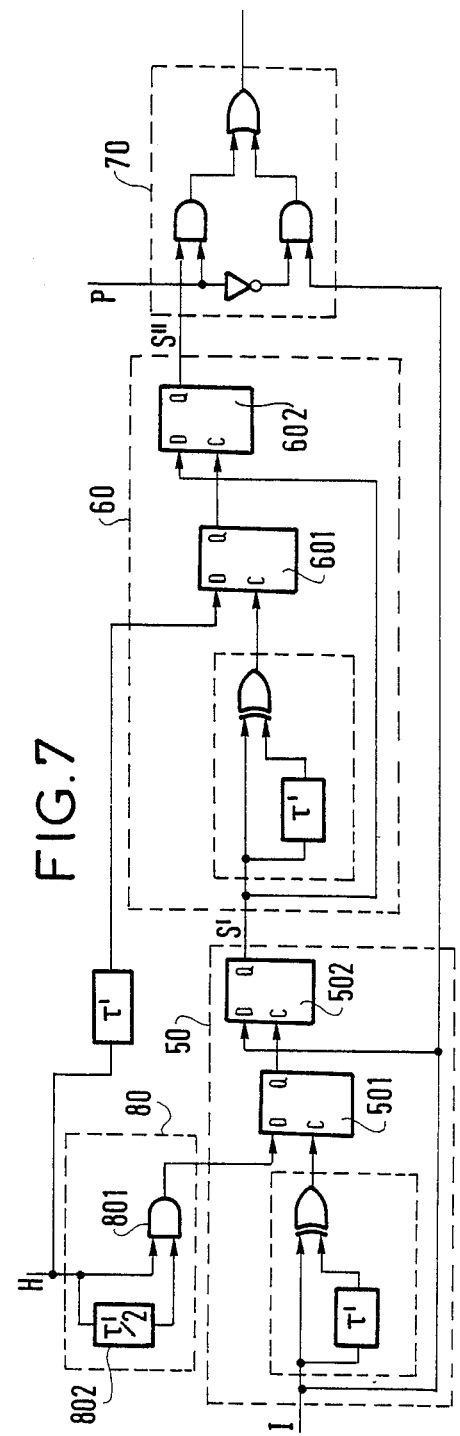

METHOD AND APPARATUS FOR REDUCING JITTER IN A SYNCHRONOUS DIGITAL TRAIN FOR THE PURPOSE OF RECOVERING ITS BIT RATE

The present invention relates to recovering the bit rate of a synchronous digital train, and more particularly to reducing the effects of jitter in the digital train on the bit rate signal recovered therefrom.

BACKGROUND OF THE INVENTION

A baseband synchronous digital train is in the form of a succession of signal periods of equal duration as defined by a bit rate and during which the signal remains at a constant level selected from a plurality of discrete values. Successive periods are separated by transitions. A geometrical pattern known as an eye diagram is obtained by superposing different periods of the digital train. Frequency limitations of a channel used for transmission purposes have the effect of distorting the digital train, with distortion appearing first at the transitions, thereby closing the eye diagram to a greater or lesser extent.

On reception, the periods are recognized by sampling their mid portions which are the least degraded by transmission, since they are furthest from the transitions. The mid portions of the periods correspond to the middle of the eye diagram.

However, in order to be able to sample the middles of the signal periods so as to facilitate recognition, it is necessary for the bit rate of the digital train to be recovered from the transitions in the train, either by mere filtering when the transmission code makes this possible, or else by nonlinear processing and filtering when the bit rate signal is accessible in the digital train only via its subharmonics.

The kind of nonlinear processing required, for example mere rectification when an HDB3 code is used, is not described in detail since the need for such processing and the manner in which it is defined are both functions of the code used, and are known to the person skilled in the art.

The filtering may be performed by means of a passive filter or by means of a phase-locked loop oscillator, and it is followed by or it includes means for adjusting the phase of the recovered bit rate signal so as to center the period sampling instants on the middle of the eye diagram, thereby providing the best possible immunity from transmission distortion.

Jitter (i.e. interfering phase modulation which displaces the transitions in the digital train from their normal positions) has unwanted effects on the bit rate signal and consequently reduces the accuracy of the instants at which the periods of the digital train are sampled, thereby increasing detection sensitivity to transmission distortion.

One known way of limiting this drawback is to attenuate the effect of digital train jitter on the recovered bit rate signal by using crystal filters, surface or volume wave filters, or phase-locked loop crystal oscillators, all of which are relatively expensive.

Preferred implementations of the present invention attenuate the sensitivity of the recovered bit rate to jitter in the originating digital train in a manner which is both simple and cheap.

SUMMARY OF THE INVENTION

The present invention provides a method of reducing the jitter in a synchronous digital train for the purpose of recovering the bit rate signal defining the succession of periods in said train, said bit rate signal being generated by a bit rate recovery circuit operating on a version of the digital train placed in baseband and suffering from jitter which spreads its transitions over a time range referred to as the jitter range, which range extends between two consecutive periods of the digital train, the method consisting in using the recovered bit rate signal to determine a time window which overlaps the beginning, but not the end, of the jitter range, and in causing those transitions in the version of the digital train intended for the bit rate recovery circuit which occur during the time window to be delayed by a fixed delay time less than the maximum peak-to-peak time period of the jitter.

On starting, the bit rate recovery circuit generates a bit rate signal on the basis of a baseband version of the digital train in which none of the transitions are delayed. Once the bit rate signal has been established, those transitions which appear in the time window are delayed. These delays cause a phase delay in the recovered bit rate signal, and consequently they shift the time window, thereby tending both to modify the number of transitions selected by the time window and to modify the phase delay in the bit rate signal in the same direction. Analysis of this operation shows that when in open loop mode, i.e. when the time window is independent from the incident digital train, the average phase error between the processed version of the digital train and the time window is a continuous function which is periodic and thus includes locations where the average phase error between the time window and the non-processed version of the digital train is reduced. This makes it possible in closed loop mode where the average phase error between the time window and the processed version of the digital train is a constant to reach a stable equilibrium position which is a function of the error value. In practice, the equilibrium position is adjusted by adjusting the value of this error and thus of the phase shift of the recovered bit rate signal so as to obtain a bit rate signal which is degraded as little as possible by jitter.

The reduction in jitter amplitude caused by such folding of the jitter range in the version of the digital train which is applied to the bit rate recovery circuit gives rise to a much greater reduction in the jitter affecting the recovered bit rate signal because of the lack of correlation between the phase errors in successive periods in the digital train.

The jitter ranges are advantageously folded in the version of the digital train applied to the bit rate recovery circuit by using the recovered bit rate signal to define a time window which covers the first half of the jitter range, and by delaying the transitions which appear during this window by a fixed amount equal to one-half of the maximum peak-to-peak time period of the jitter.

Such folding may also take place in successive stages, with each stage then consisting in using the recovered bit rate signal to determine a time window covering the beginning, but not the end, of each jitter range in the version of the digital train intended for the bit rate recovery circuit in the state in which it occurs at the beginning of the stage, and in imposing delays of fixed duration less than the maximum peak-to-peak amplitude of the jitter on those transitions in said version which appear during the corresponding time window.

The durations of the delays applied to the transitions are selected as a function of the maximum peak-to-peak time period of the jitter, and may lead to jitter being amplified if it is initially of small amplitude. Thus, when dealing with variable amplitude jitter it is advantageous to adopt a method of jitter reduction using successive stages in which the early stages use a time window which extends over less than the first half of the jitter ranges, for example over the first third only, thereby ignoring transitions having a small phase lead due to low amplitude jitter. Simultaneously, the duration of the delay applied to transitions occurring within the time window is less than one-half of the maximum peak-to-peak time period of the jitter and may be equal to one-third thereof, for example. The last stage is designed to reduce low amplitude jitter (to which any large amplitude jitter will have been reduced by the early stages) and therefore has a time window extending over the first half of the reduced jitter range and a delay duration equal to one-half of the maximum peak-to-peak time period of the reduced amplitude jitter actually applied to the last stage.

The invention also relates to apparatus for performing the above method by means of logic circuits which are easily integrated.

BRIEF DESCRIPTION OF THE DRAWINGS

Implementations of the present invention are described by way of example with reference to the accompanying drawings, in which:

FIG. 6 is a circuit diagram of a two-stage version of the FIG. 2 circuit and providing increased jitter reduction capacity;

FIG. 7 is a circuit diagram of a two-stage version of the FIG. 2 circuit suitable for use with a digital train having variable amplitude jitter;

MORE DETAILED DESCRIPTION

Figure 1:
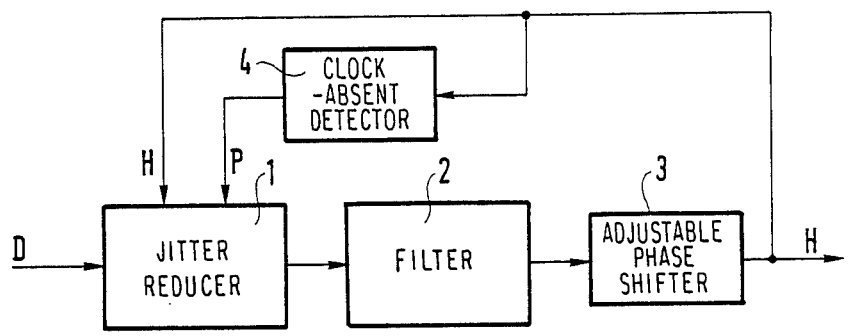
FIG. 1 is a block diagram of a bit rate recovery system including a jitter reducer in accordance with the invention.

FIG. 1 situates the jitter reduction apparatus (a "jitter reducer") in accordance with the invention relative to a circuit for recovering the bit rate of a synchronous digital train.

The jitter reducer 1 is inserted ahead of the filter portion 2 of the bit rate recovery circuit, which portion is shown as being independent of means for adjusting the phase of its output signal, which means are shown separately as an adjustable phase shifter 3. The filter portion may comprise either a passive filter or else an active filter using an oscillator and a phase-locked loop. The jitter reducer is clocked by the recovered clock signal H which is available from the output of the adjustable phase shifter 3, and it is controlled by an inhibit signal P which is delivered by a clock-absent detector circuit 4 so long as the recovered bit rate signal has not been established. The clock-absent detector 4 may be an envelope detector if the filter portion 2 is a passive filter circuit, or else it may be an acquisition detector if the filter portion is an oscillator having a phase-locked loop.

So long as the established recovered bit rate signal H is absent, the jitter reducer 1 is inhibited and it merely transfers the signal applied to its input directly to its output.

When an established recovered bit rate signal H is present, the jitter reducer 1 uses the recovered bit rate signal H to define a time window which covers the beginning, but not the end, of the incident jitter range. The jitter reducer then selects transitions which appear in the time window, i.e. relatively early transitions within the jitter range and delays them by a fixed period which is less than the duration of the jitter range. Both the undelayed late transitions and the delayed early transitions are applied to the filter portion 2 of the bit rate recovery circuit, thereby reducing the overall length of the jitter range applied to the filter circuit by folding said range onto itself.

Figure 2:
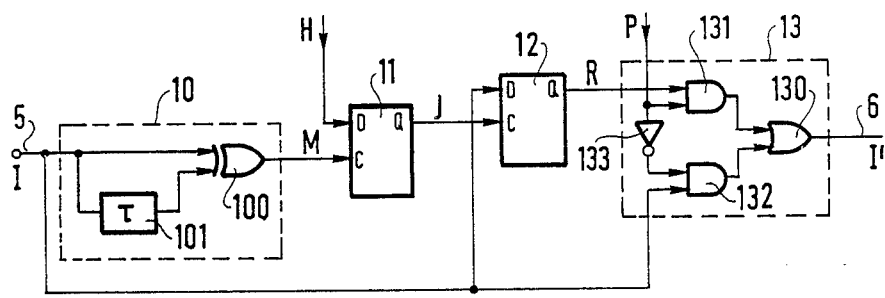
FIG. 2 is a circuit diagram of a single stage jitter reducer in accordance with the invention and suitable for processing a binary signal.

FIG. 2 shows an embodiment of a jitter reducer circuit for operating with a binary input signal I taken from a digital train for application to the filter portion of the bit rate recovery circuit, and with a symmetrical rectangular version H of the recovered bit rate signal having falling edges at the instants when transitions ought theoretically to appear in the digital train.

This case is fairly general. It may occur, in particular, when the signal applied to the filter portion of the bit rate recovery circuit is a digital train using a biphase code, or the result of rectifying the digital train when using a bipolar code.

The input 5 to the jitter reducer receives the binary signal I for application to the filter portion of the bit rate recovery circuit, and this input is connected to a pulse generator 10 whose output is connected to the inhibit input C of a first D-type register 11 whose data input D receives the recovered bit rate signal H. The input I is also connected to the data input D of a second D-type register 12 whose inhibit input C is connected to receive an inhibit signal J from the Q output of the first D-type register 11. Finally, the input 5 is connected to one of the inputs of a two-input multiplexer 13 having a single output 6 which constitutes the output from the jitter reducer and which delivers a binary signal I'. The other input to the multiplexer 13 is connected to receive a signal R from the Q output of the second D-type register 12, and the addressing input of the multiplexer receives the inhibit signal P as generated by the clock-absent detector 4.

The pulse generator 10 is constituted by a two-input exclusive OR gate 100 having one input directly connected to the input 5 of the jitter reducer and having its other input connected thereto via a delay circuit 101 which determines the pulse length by virtue of its delay $\tau$. All transitions in the signal I intended for the filter portion of the bit rate recovery circuit are transformed by the pulse generator 10 into pulses of duration $\tau$.

The multiplexer 13 comprises a two-input logic OR gate 130 with each of its inputs connected to the output from a respective two-input AND gate 131 or 132 which gates are controlled in phase opposition by the clock-absent detector and an inverter 133.

In the absence of an established bit rate signal, the signal I as applied to the input 3 of the jitter reducer is connected to the output 6 of the jitter reducer via the multiplexer 13.

When an established bit rate signal H is present, the phase of this signal is adjusted by means of the phase adjustment circuit 3 so that its falling edges coincide with the middles of the jitter range in the digital train, and so that it has a high level which is suitable for defining the time window during which transitions in the signal I for the filter portion of the bit rate recovery circuit are delayed by a duration $\tau$ equal to one-half of the duration of the jitter range.

Since the jitter range is equally distributed over the end of one period of the digital train and the beginning of the next period, the selected time window covers jitter range over a duration $\tau$ corresponding to the first half of the jitter range. As a result, transitions in the first half of the jitter range as selected by means of the time window are moved out from said first half by a delay of duration $\tau$, so that the output signal from the jitter reducer does not have any transitions during the time window. This property makes it possible both to select the transitions which will be delayed and the amount of the delay by making the signal I which is intended for application to the filter portion of the bit rate recovery circuit transit through the second D-type register 12 which is prevented from passing signals for time intervals which correspond to the length of the time windows. The end of these time intervals therefore occur at a period $\tau$ after each corresponding transition in the signal I. The blocking signal J which defines these time intervals is itself generated by the first D-type register 11 through which the recovered bit rate signal H transits and which is itself blocked in a non-signal passing condition of duration $\tau$ after each transition in the signal I by the signal M which is delivered by the pulse generator 10. As a result, the beginnings of the pulses in the signal J correspond to the beginnings of the windows, unless they happen to be delayed by the period $\tau$ from a transition in the signal I.

Figure 3:
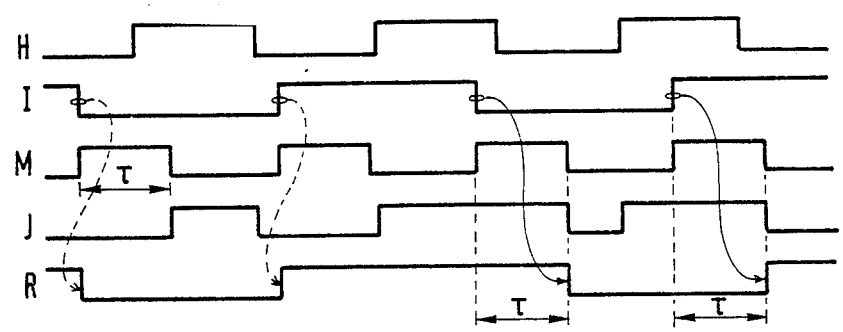
FIG. 3 is a diagram showing waveforms of signals at various points in the FIG. 2 circuit.

FIG. 3 is a diagram showing the waveforms of the following signals: M at the output from the pulse generator 10; J at the output Q from the first D-type register 11; and R at the output Q from the second D-type register 12. These signals are shown as a function of the waveforms of the recovered bit rate H and of the input signal I. In this diagram, it may be observed that the transitions in the signal I are transmitted so long as the level of the recovered bit rate signal H is low, while transitions in the signal I are transmitted after a delay $\tau$ if they occur while the recovered bit rate signal H is at a high level.

If the jitter reducer shown in FIG. 2 which is designed for processing a digital train whose maximum jitter range amplitude does not exceed $2\tau$, is used for processing a digital train whose jitter range amplitude is greater than $2\tau$, it fails to delay the earliest transitions by the fixed duration $\tau$, i.e. those transitions with a lead of more than $\tau$ from the instants when they should theoretically have been expected. These earliest transitions are delayed by the duration of their lead, i.e. they are made to coincide with falling transitions in the recovered bit rate signal, and therefore do not serve usefully in recovering the bit rate.

A simple manner of adapting the FIG. 2 circuit to ensure that even the earliest transitions in the input signal are delayed by the selected fixed duration when operating under such circumstances consists in adding a circuit for detecting the end transitions of the pulses of duration $\tau$ as delivered by the generator 10 which occur during a high level of the recovered bit rate signal H for the purpose of resetting to zero the first D-type register 11 on each occasion that such a very early transition is detected. This detection circuit is not shown, but may be implemented by means of a three-input AND gate whose inputs are respectively connected to receive the recovered bit rate signal H, the output signal from the pulse generator 10 via an inverter, and the output signal from the generator 10 via a short-delay delay circuit, with the output from said three-input AND gate being connected to a reset to zero input of said first D-type register 11.

Figure 4:
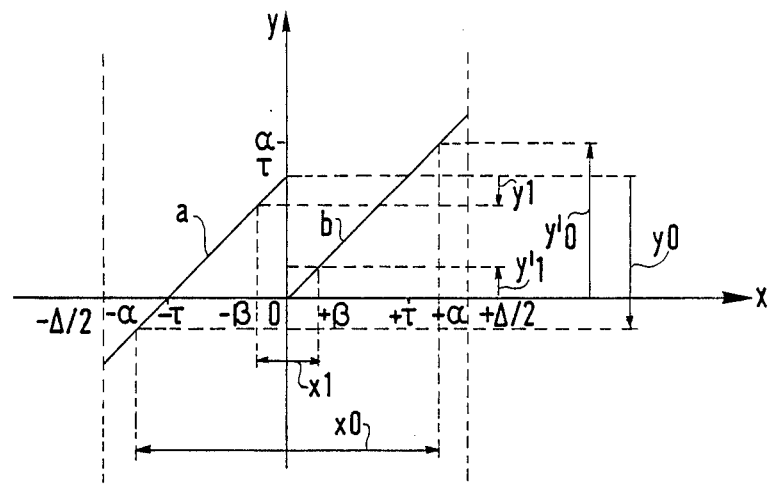
FIG. 4 is a diagram showing the transfer function between jitter in and jitter out for the FIG. 2 circuit.

The reduction in jitter amplitude obtained between the input and output signals of the jitter reducer described above (including the above-described adaptation for coping with an input jitter having a peak-to-peak time period greater than $2\tau$) can be seen by studying the jitter IN to jitter OUT transfer characteristics of said jitter reducer, as shown in FIG. 4.

This characteristic has been plotted by centering the input jitter range x0 or x1 on the Y axis. The input jitter range is limited to an absolute value of less than $\pm \tau/2$ plotted along the X axis, where $\Delta$ is the period of the bit rate signal or the duration of a period in the digital train, since it is assumed that the digital train does at least remain recognizable and that its eye diagram is open to at least some small extent. The transfer characteristic is constituted by two straight line segments a and b sloping at 45° to the X axis, with the segment a passing through the points $(0,\tau)$ and $(-\tau,0)$ and with the segment b passing through the origin $(0,0)$ and the point $(\tau,\tau)$. These two separate segments are due to selecting a time window which serves to ensure that early transitions in the first half of the jitter range of the input signal are not processed in the same way as late transitions. The segment a relates to the transfer characteristic applicable to the first half of the jitter range and shows that transitions which occur in said first half are subjected to a uniform delay of duration $\tau$, while the segment b relates to the transfer characteristic applicable to the second half of the jitter range and shows that transitions which occur in said second half are not delayed.

For an input jitter range x0 of amplitude $2\alpha$ greater than $2\tau$, the jitter reducer applies a uniform delay of duration $\tau$ to first half transitions $-\alpha,0$ which thus occur in an output jitter range y0 situated between $\tau-\alpha,\tau$ while leaving unaltered second half transitions $0,\alpha$ which occur in an output jitter range y'0 situated between $0,\alpha$. These two jitter ranges y0 and y'0 overlap each other for a duration $\tau$ while each of them conserves one-half of the input jitter amplitude so that the overall output jitter amplitude is reduced by $\tau$.

For an input jitter range x1, of amplitude $2\beta$ less than $2\tau$, the jitter reducer uniformly delays first half transitions $-\beta,0$ by an amount $\tau$ and these delayed transitions occupy an output jitter range y1 situated between $\tau-\beta,\tau$ while leaving second half transitions $0,\beta$ which appear in an output jitter range y'1 situated between $0,\beta$. These two jitter ranges y1 and y'1 no longer overlap for a duration τ, and as a result the overall jitter in the output signal is equal to τ.

Figure 5:
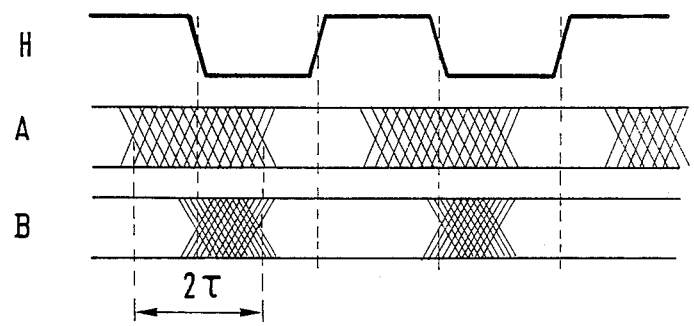
FIG. 5 is a waveform diagram showing the effects on the eye diagram of the transition delays performed by the FIG. 2 circuit.

The peak-to-peak jitter reduction rate thus passes through a maximum of 6 dB when the delay τ corresponds to one-half of the peak-to-peak a time period of the jitter in the input signal. This situation is represented in the diagram of FIG. 5 which shows the recovered signal H, the eye diagram A of the input signal to the jitter reducer showing jitter of amplitude 2τ which is less than the duration of one period in the digital train, and the eye diagram B of the output signal from the jitter reducer.

The transitions in the input signal to the jitter reducer which occur in the time window defined by the high level of the recovered bit rate signal belong to the first half of the jitter range since the rising edge of the recovered bit rate signal is positioned in the middle of the eye diagram. Delaying such transitions by a period τ has the effect of displacing the first half of the jitter range so that it overlaps the second half thereof, thereby halving the amplitude of the jitter range in the output signal from the jitter reducer. This reduction of jitter amplitude by one-half gives rise to a much greater reduction in the jitter of the recovered bit rate signal by virtue of the decorrelation added by transition displacement relative to the phase errors of successive periods in the digital train.

If the amount of jitter reduction obtained is insufficient, the operation may be reiterated a plurality of times with each stage using a delay which is one-half of the delay used by the preceding stage, and with each stage applying said delay to the version it uses of the recovered bit rate signal in order to correct for the off-centering effect on the rising edges due to the first halves of the jitter ranges being systematically eliminated.

FIG. 6 shows a first variant of this type of the FIG. 2 circuit. This first variant comprises two successive stages 20 and 30 which are of identical structure to that shown in the single stage of FIG. 2 (less the output multiplexer) followed by a single output multiplexer 40 which is applicable to the entire two-stage jitter reducer.

The recovered bit rate signal H is adjusted, as before, so that its falling edges occur in the middle of the jitter range of the input signal I.

The first stage 20 operates directly from the recovered bit rate signal H. It has a pulse generator providing pulses of duration τ equal to one-half of the maximum peak-to-peak a time period of the jitter in the input signal I, and it delivers an output signal R' having a jitter range which has lost its first half, i.e. which has a maximum amplitude divided by two and equal to τ.

The second stage 30 operates on a version of the bit rate signal which has been delayed by τ/2 by a delay circuit 25 in order to recenter its rising edges relative to the eye diagram of the output signal R'. The second stage has a pulse generator for generating pulses of duration τ/2 equal to one-half of the peak-to-peak a time period of the jitter in the signal R' which is applied thereto, and it delivers an output signal R" in which the jitter range has again lost its first half to obtain a maximum amplitude τ/2, thereby giving an overall peak-to-peak jitter reduction factor of four.

The multiplexer 40 placed at the output of the two-stage jitter reducer is identical to the multiplexer 13 shown in the FIG. 2 circuit and serves, as in the FIG. 2 circuit, to replace the output signal from the jitter reducer by its input signal so long as a recovered bit rate signal H is not established.

Returning to the jitter transfer characteristic shown in FIG. 4, it can be seen that the FIG. 2 jitter reducer has the drawback of increasing the peak-to-peak jitter a time period when the input jitter is of small amplitude, i.e. less than τ. This drawback can be reduced by operating in successive stages, and by ensuring that the early stages use time windows which cover only small portions of the beginnings of the corresponding jitter ranges so that they only process transitions due to high amplitude jitter, thereby ensuring that high amplitude jitter is reduced to small amplitude jitter for further processing.

FIG. 7 shows an example of a circuit for reducing jitter in two successive stages, using a first stage during which only those transitions which have relatively large phase lead are selected by a time window which covers only the first third of the jitter range, with said large lead transitions being delayed by τ' where τ' is equal to one-third of the maximum jitter amplitude. This first stage is followed by a second stage during which all leading transitions (which may be due either to low initial jitter or else to a correction applied to large phase lead jitter by the first stage) are selected using a time window which covers the first half of the jitter range as reduced by the first stage and are delayed by a duration τ' equal to one-half of the maximum peak-to-peak a time period of the jitter as reduced by the first stage or to one-third of the maximum peak-to-peak a time period of the initial jitter.

This jitter reducer has two stages 50 and 60 which are identical to the stages shown in FIG. 6 except that the various delay circuits apply different delay values, and in particular in the FIG. 7 circuit the applied delays are equal to τ'. A further differences lies in a window-forming circuit 80 which is driven by the recovered bit rate signal H.

Figure 8:
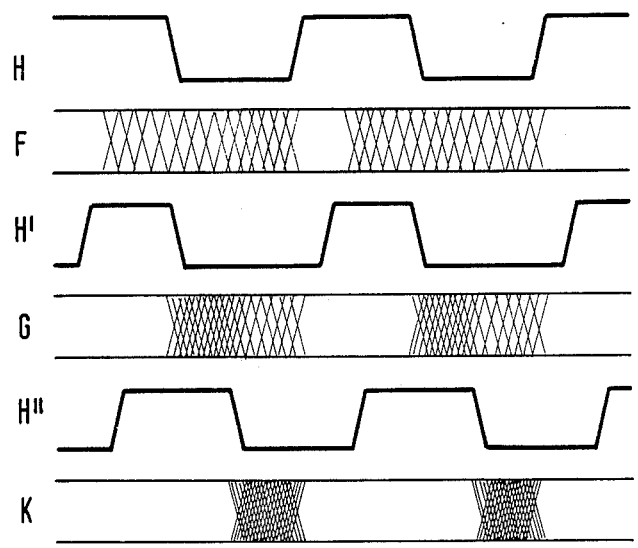
FIG. 8 shows the effects on the eye diagram of the two stages of transition delay applied to the digital train by the FIG. 7 circuit.

The mode of operation of this circuit is illustrated by the waveform diagram of FIG. 8 where H represents the recovered bit rate signal H, F is the eye diagram of the input signal I applied to the input of the jitter reducer, H' is the signal H' which defines the first window as used by the first stage 50, G is the eye diagram of the output signal S' from the first stage 50, H" is the signal H" defining the second window as used by the second stage 60, and K is the eye diagram of the output S" from the second stage of the jitter reducer.

Unlike the previous circuits, the phase of the recovered bit rate signal H is adjusted so that falling edges therein coincide with the end, not of the first half, but rather of the first third, of the jitter ranges in the input signal I whose eye diagram is shown at F.

The window-forming circuit 80 serves to bring the rising edges of the signal H' whose falling edges coincide with those of the signal H into the vicinity of the middle of the eye diagram of the signal I so as to define a first window which does not include the ends of the jitter ranges. This is unnecessary if the maximum peak-to-peak a time period of the jitter in the input signal I does not exceed three-quarters of the duration of a single period of the digital train. A two-input logic AND gate 801 is used for this purpose, with one input directly connected to the output of the bit rate recovery circuit and with its other input connected thereto via a delay circuit 802 providing a delay τ'/2.

The first stage 50 of the jitter reducer uses the signal H' to select those transitions in the input signal I which occur in the first third of the jitter range and it delays these selected transitions by the duration $\tau'$ which has the effect of transposing them to the second (or middle) third of the input jitter range and consequently of removing the first third from the jitter range of the output signal S' from said first stage, thereby giving rise to an eye diagram as shown at G.

The version H" of the recovered bit rate signal which is deduced from the recovered bit rate signal H after a delay $\tau'$ defines a second window when it is in the high state which overlaps the previous window defined by the high state of the signal H' and which includes the second third of the jitter range in the input signal I, i.e. the first half of the jitter range in the output signal S' from the second stage 50.

The second stage 60 of the jitter reducer uses the signal H" to select the transitions in the output signal S' from the first stage which occupy the first half of the jitter range of said signal, and it delays these selected transitions by $\tau'$, thereby removing the first half of the jitter range from the signal S' output by the first stage 50 and reducing the overall peak-to-peak jitter range to one-third of its original value.

It may be observed that the first stage has no effect when the peak-to-peak time period of the input jitter does not exceed $\tau$, and that the FIG. 7 circuit consequently avoids amplifying low amplitude input jitter in the manner of the FIG. 2 circuit and the FIG. 6 circuit.

Figure 9:
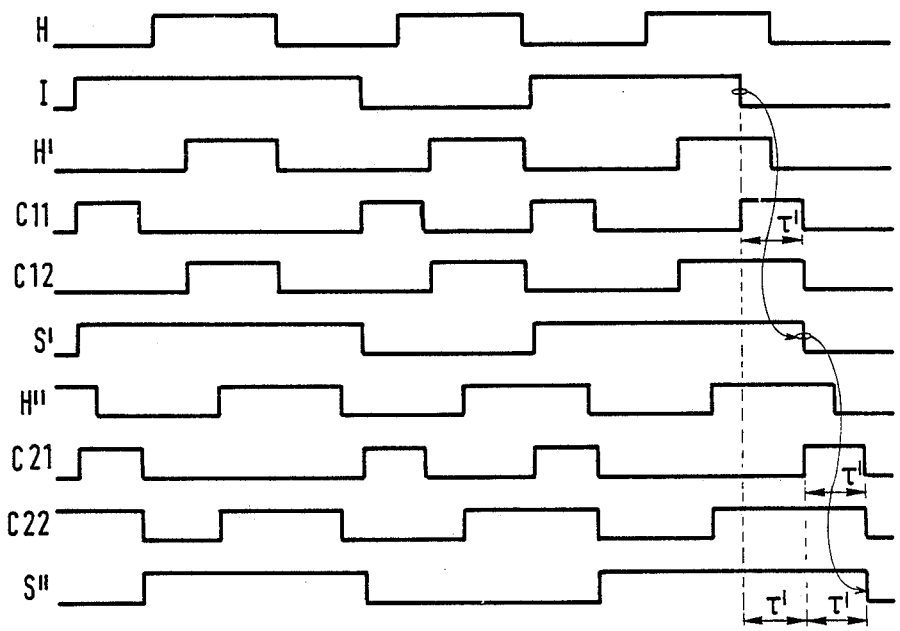
FIG. 9 is a diagram showing waveforms present at various points of the FIG. 7 circuit.

Waveform diagrams in FIG. 9 show the waveforms at various different point of the two-stage jitter reducer shown in FIG. 7. These waveforms include the recovered bit rate signal H, the binary input signal I whose jitter amplitude is to be reduced, the version H' of the bit rate signal as applied to the data input of the first D-type register 501 of the first stage 50, the signal C11 applied to the inhibit input of said D-type register 501, the signal C12 available at the Q output from said D-type register 501 and applied to the inhibit input of the second D-type register 502 of the first stage 50, the output signal S' from the first stage 50, the version H" of the recovered bit rate signal applied to the data input of the first D-type register 601 of the second stage 60, the signal C21 applied to the inhibit input of the first D-type register 601, the signal C22 available at the Q output from said D-type register 601 and applied to the inhibit input of the second D-type register 602 of the second stage 60, and the reduced jitter amplitude output signal S" available at the output from said second stage 60.

It may be observed in this figure that the delay $\tau'$ is applied twice over to those early transitions in the binary signal applied to the inputs of the FIG. 7 jitter reducer circuit which occur in the first time window as used by the first stage 50. Less early transitions which occur only in the second time window used by the second stage 60 are delayed by $\tau'$ once only, and transitions which do not occur in either time window are not delayed at all.

The above-described jitter reducing method is implemented using logic circuits suitable for integration, as can be seen from the specific embodiments described.

I claim:

1. In a method of reducing the jitter in a synchronous digital train for the purpose of recovering the bit rate signal defining a succession of periods in said train, said bit rate signal being generated by a bit rate recovery circuit operating on a version of the digital train at baseband and suffering from jitter which spreads its transitions over a time range referred to as the jitter range, which range extends between two consecutive periods of the digital trains, the improvement comprising using a recovered bit rate signal to determine a time window which overlaps the beginning, but not the end, of the jitter range, and in causing those transitions in the digital train applied to the bit rate recovery circuit which occur during the time window to be delayed by a fixed delay time less than the maximum peak-to-peak time period of the jitter.

2. A method according to claim 1, including a plurality of successive stages during which the jitter affecting the digital train to be applied to the bit rate recovery circuit is reduced progressively, with each stage using the recovered bit rate signal to determine a time window which overlaps the beginning, but not the end, of each jitter range in the digital train in the state in which it occurs at the beginning of the stage, and in imposing fixed duration delays on those transitions in said digital train which occur in said time window, said fixed delay durations being less than the maximum peak-to-peak time period of the jitter at said stage.

3. A method according to claim 1, wherein said window is determined in such a manner as to cover the first half of the jitter range in the version of the digital train to be applied to the bit rate recovery circuit, and wherein said fixed duration delay is chosen to be equal to one-half of the maximum peak-to-peak time period of the jitter.

4. A method according to claim 1, wherein said windows are determined in such a manner as to cover one-third of the jitter range of the digital train to be applied to the bit rate recovery circuit, and wherein said fixed delay duration is equal to one-third of the maximum time period of the jitter.

5. A method according to claim 2, wherein said jitter is progressively reduced in two stages, namely:
a first stage during which the recovered bit rate signal is used to determine a first time window overlapping the first third of each jitter range in the version of the digital train to be applied to the bit rate recovery circuit, and in which those transitions in said digital train which occur during said first time window are delayed by a fixed delay duration equal to one-third of the maximum time period of the jitter affecting said digital train; and
a second stage during which the recovered bit rate signal is used to determine a second time window overlapping the first half of the jitter range in the digital train resulting from implementing the first stage and wherein the transitions in the digital train resulting from implementing the first stage which occur during the second time window are delayed by a fixed delay duration equal to one-half of the maximum peak-to-peak time period of the jitter in said digital train resulting from implementing the first stage.

6. Apparatus for reducing the jitter in a synchronous digital train for the purpose of recovering a bit rate signal defining the succession of periods in said train, said bit rate signal being generated by a bit rate recovery circuit including a filter portion to which a version of the digital train at basehand is applied, said version being affected by jitter which spreads its transitions over a time range referred to as the jitter range which extends between two consecutive periods of said digital train, said recovered bit rate signal being in the form of a symmetrical signal having a first level which corresponds to a time window extending over the second half of each period in the digital train, said apparatus comprising:
- first pulse generator means transforming into pulses the transitions in the digital train to be applied to the filter portion of the bit rate recovery circuit as applied to a signal input of said apparatus, said pulses being of fixed duration and shorter than the maximum peak-to-peak time period of the jitter affecting said digital train;
- first delay mans having a first input connected to receive the recovered bit rate signal from the bit rate recovery circuit and having a second input connected to receive the pulses generated by the pulse generator, and serving to delay the transitions in the recovered bit rate signal to the ends of the pulses from the pulse generator;
- second delay means having a first input connected to receive the digital train applied to the filter portion of the bit rate recovery circuit and having a second input connected to receive the bit rate signal with transitions as delayed by the first delay means, and serving to delay the positions in said digital train so that they lie outside the first level periods of the bit rate signal whose transitions have been delayed by the first delay means; and
- multiplexer means at the output from the apparatus and serving to replace on said output the signal delivered by the second delay means by the digital train applied to the input of the apparatus so long as a bit rate signal has not been established.

7. Apparatus according to claim 6, receiving a recovered bit rate signal with its position adjusted to the middle of the jitter range of the digital train to be applied to the filter portion of the bit rate recovery circuit as applied to its input, wherein the pulse generator means generate fixed duration pulses whose duration is equal to one half of the maximum peak-to-peak time period of the jitter.

8. Apparatus according to claim 6, receiving a recovered bit rate signal with its position adjusted to the first third of the jitter range of the digital train applied to the filter portion of the bit rate recovery circuit as applied to its input, wherein the pulse generator means generate fixed duration pulses whose duration is equal to one third of the maximum peak-to-peak time period of the jitter.

* * * * *